(12) United States Patent
Fahnenstich

(10) Patent No.: US 8,936,418 B2
(45) Date of Patent: Jan. 20, 2015

(54) GUIDE DEVICE FOR HAND-HELD SPOT WELDING ELECTRODE MILLING CUTTER

(75) Inventor: Stefan Fahnenstich, Grobenzell (DE)

(73) Assignee: Lutz Precision, k.s.

( * ) Notice: Subject to any disclaimer, the term of this patent is extended or adjusted under 35 U.S.C. 154(b) by 793 days.

(21) Appl. No.: 13/146,891

(22) PCT Filed: Jan. 21, 2010

(86) PCT No.: PCT/EP2010/000351
§ 371 (c)(1),
(2), (4) Date: Sep. 12, 2011

(87) PCT Pub. No.: WO2010/086117
PCT Pub. Date: Aug. 5, 2010

(65) Prior Publication Data
US 2012/0014761 A1    Jan. 19, 2012

(30) Foreign Application Priority Data
Jan. 29, 2009   (DE) .................... 10 2009 006 585
Jan. 21, 2010   (EP) ................. PCT/EP2010/000351

(51) Int. Cl.
*B23C 3/12*    (2006.01)
*B23B 5/16*    (2006.01)
*B23K 11/30*    (2006.01)

(52) U.S. Cl.
CPC ............ *B23B 5/166* (2013.01); *B23K 11/3063* (2013.01)
USPC ......................................... 409/140; 409/138

(58) Field of Classification Search
CPC .................................................... B23B 5/166
USPC ............................................. 409/138, 139, 140
See application file for complete search history.

(56) References Cited

U.S. PATENT DOCUMENTS

| | | | | |
|---|---|---|---|---|
| 2,284,483 A | * | 5/1942 | Whitesell, Jr. ............... | 408/234 |
| 2,286,931 A | * | 6/1942 | Radeke ......................... | 425/125 |
| 3,283,662 A | | 11/1966 | Weglin | |
| 4,842,456 A | * | 6/1989 | Saito ............................. | 409/145 |
| 4,966,506 A | * | 10/1990 | Slanker ......................... | 409/140 |
| 5,332,342 A | | 7/1994 | Kizaki et al. | |
| 5,401,127 A | | 3/1995 | Nakajima et al. | |
| 5,993,125 A | * | 11/1999 | Shimada ....................... | 409/140 |
| 2005/0238445 A1 | * | 10/2005 | Johansson et al. ........... | 407/113 |

FOREIGN PATENT DOCUMENTS

| | | |
|---|---|---|
| CN | 1739899 A | 3/2006 |
| DE | 7421277 | 11/1974 |
| DE | 4213571 | 10/1992 |

(Continued)

OTHER PUBLICATIONS

International Search Report, Second and Supplementary Notice Informing the Applicant of the Communication of the International Application, Notice Concerning Submission or Transmittal of Priority Document, PCT/EP2010/000351, Jan. 21, 2010.

*Primary Examiner* — Daniel Howell
*Assistant Examiner* — Michael Vitale
(74) *Attorney, Agent, or Firm* — Marshall, Gerstein & Borun LLP

(57) ABSTRACT

A device for finishing spot welding electrodes comprises a milling head that is suited for said finishing of spot welding electrodes. The device furthermore comprises a guide device for guiding the milling head relative to at least one spot welding electrode or relative to at least one spot welding electrode shaft.

13 Claims, 3 Drawing Sheets

(56) References Cited

FOREIGN PATENT DOCUMENTS

| | | |
|---|---|---|
| DE | 19725256 | 12/1998 |
| EP | 1629911 | 3/2006 |
| EP | 1629911 A2 | 3/2006 |
| EP | 2002911 A1 * 12/2008 | ................ B23B 5/16 |
| JP | 2002-045974 A | 2/2002 |
| JP | 2004-074237 A | 3/2004 |

* cited by examiner

GUIDE DEVICE FOR HAND-HELD SPOT WELDING ELECTRODE MILLING CUTTER

FIELD OF THE INVENTION

The invention relates to a device and to a hand-held milling cutter for dressing spot welding electrodes.

BACKGROUND

To combine sheet metal parts firmly with each other, craft enterprises or industrial facilities such as automobile manufacturing facilities, often make use of welding robots with welding guns. During a welding operation, the welding gun presses two or more sheet metal parts together from two opposite sides, respectively, with an electric current flowing through spot welding electrodes provided in the welding gun arms so as to be able to weld the sheet metal parts together very precisely. The closing pressure of a spot welding gun during the operation can be up to 3 to 8 kN. After approximately 100 to 300 welding operations, the spot welding electrodes are worn-out to such an extent or covered with welding leftovers that any reliable welding might no longer be possible.

To enable the spot welding electrode tips to resume their original shape, said tips are dressed or finished by means of an electrode milling cutter (or tip dresser). For overhauling the worn-out spot welding electrodes consisting of a relatively soft copper it will mostly suffice to remove less than 0.1 mm of the material from the spot welding electrode tips.

Welding electrodes usually comprise exchangeable caps. However, they may also be made of one piece without such caps. The statements following below equally refer to both cases, as dressing of spot welding electrodes can be done for one-piece electrodes just as well as for electrodes having caps.

Dressing a spot welding electrode tip can be done several times (after approximately 100 to 300 welding operations, respectively). To obtain milling results of a consistently high quality, it may be advantageous to have the milling head of the milling cutter positioned as exactly as possible relative to the spot welding electrode tip for each milling operation. Optimum milling performance can be obtained when the axis of rotation of the milling cutter more or less coincides with the axis of symmetry of the spot welding electrode.

However, in practice such coincidence can only hardly be achieved, especially when the milling cutter is a hand-held milling cutter which is guided manually towards the spot welding electrode tip. During the milling operation it may happen that the milling cutter slide-slips from the spot welding electrode tip or slips out of position, or that the milling head is put onto the spot welding electrode tip in slightly inclined manner which means that, in both cases, the axis of rotation of the milling head and the axis of symmetry of the spot welding electrode coincide in a just insufficient manner.

Accordingly, it is the object of the invention described below to provide a device and a hand-held milling cutter used for dressing spot welding electrodes in such a manner that results of a consistently high quality can be achieved.

SUMMARY

This object is solved by means of a device for dressing spot welding electrodes according to claim 1 and by means of a hand-held milling cutter for dressing spot welding electrodes according to claim 13.

Preferred embodiments have been disclosed in the dependent claims.

Further aspects of conceivable embodiments of the invention will become apparent from FIGS. 1a, 1b, 2a, 2b and 2c, in which

DETAILED DESCRIPTION

Figure 1A:
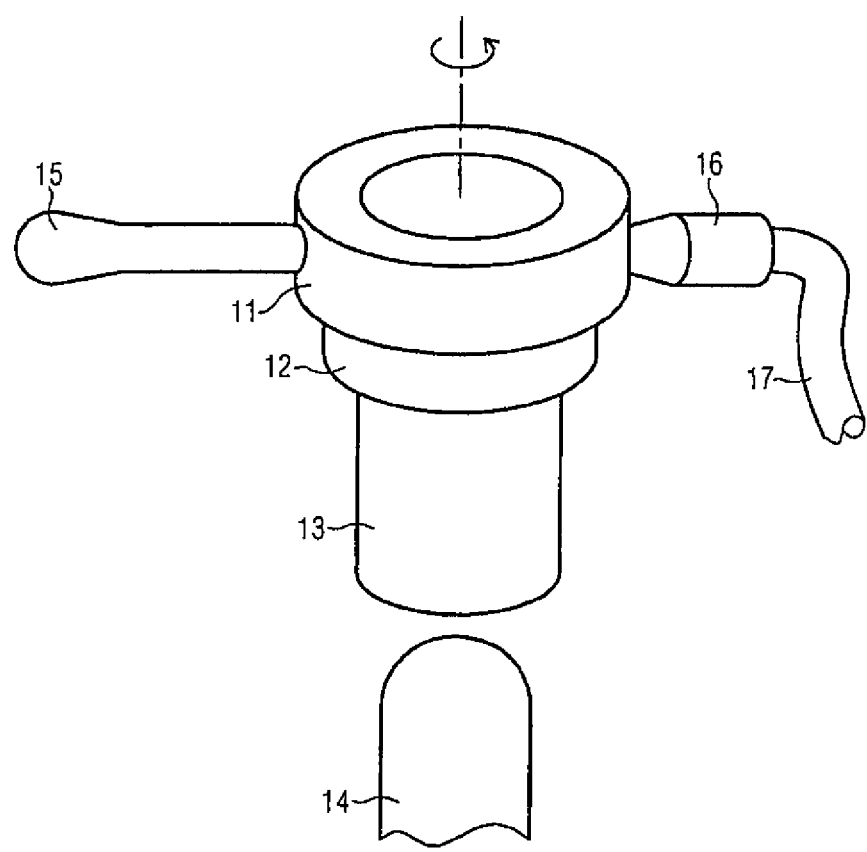
FIG. 1a is a schematic view of a device for dressing spot welding electrodes.

The device for dressing spot welding electrodes comprises a milling head that is adapted for dressing such spot welding electrodes. For example, spot welding electrode material exhausted by the milling head is removed such that the spot welding electrode tip obtains its original shape again. The device for dressing spot welding electrodes further comprises a guide device that is adapted to guide the milling head relative to at least one spot welding electrode. When parts of the spot welding electrode are located within a spot welding electrode shaft said guide device may also be used for guiding the milling head relative to at least one spot welding electrode shaft.

The guide device has the effect to prevent or restrict e.g. motions perpendicular to the longitudinal axis of the spot welding electrode or to the spot welding electrode shaft. Accordingly, it is aimed to achieve that the axis of rotation of the milling head and the axis of symmetry of the spot welding electrode coincide as exactly as possible during the entire milling operation. Ideally, it is achieved by means of said guide device that the milling head can only be moved in one direction relative to the spot welding electrode, viz, in the direction parallel to the axis of symmetry of said spot welding electrode or parallel to the axis of rotation of said milling head.

Typically, the guide device is connected to the milling head via an adapter piece. Alternatively, it is however also possible to have the guide device being directly connected to the milling head. To use one or more adapter pieces allows the mounting of diverse guide devices so as to be able to guide or machine spot welding electrodes or spot welding electrode shafts of different diameters.

The guide device can be connected to the milling head in such a manner that said guide device is rotating, during milling, around the spot welding electrode or the spot welding electrode shaft, or, alternatively, the guide device can be mounted such that, during milling, is not rotating around the spot welding electrode or the spot welding electrode shaft (in such a case, the guide device is mounted to a non-rotating part of the milling head or of the adapter piece so that the guide means does normally not perform rotary movements). The guide device can be connected to the milling head or to the adapter piece either by screws, bonding or inserting or by combinations thereof. A detachable solution is preferred that, e.g. allows to exchange the guide device.

Typically, the guide device is located at the side of the milling head from which the spot welding electrode or the spot welding electrode shaft is coming for machining. Moreover, the guide device typically is of substantially annular shape. It may be provided in its inner region with spacers such as bulges, ribs or knobs. Thus, the spot welding electrodes or spot welding electrode shafts can be guided, so that cavities remain between guide device and spot welding electrode or spot welding electrode shaft that might contain, e.g. removed or exhausted spot welding electrode material (e.g. milling splinters or chips) without affecting the insertion of the spot welding electrode or the spot welding electrode shaft in case that any spot welding electrode material has entered into the guide device.

The clearance between spot welding electrode, or spot welding electrode shaft, and guide device is normally less than 1 mm, preferably less than 0.5 mm or 0.1 mm. At the side facing away from the milling head of the guide device, the above-mentioned clearance may be larger (e.g. more than 5 mm or 10 mm), thus facilitating insertion of the spot welding electrode or the spot welding electrode shaft into the guide device.

In case of an annular guide device the height of said guide device preferably is at least equal to half of or to the entire of or to the double inner diameter of the guide device. Owing to the use of a guide device of a greater height, better guidance can be achieved, as the greater height results in a smaller angular deviation between the axis of rotation of the milling head and the axis of symmetry of the spot welding electrode or the spot welding electrode shaft.

In a preferred embodiment of the invention, the guide device encompasses the spot welding electrode or the spot welding electrode shaft in a side area that is at least 1 cm, 2 cm or 3 cm away from the outermost end of the spot welding electrode to be dressed. The spot welding electrode tip to be dressed is not guided by the guide device but the area of the sport welding electrode or the spot welding electrode shaft placed behind. In said area, the spot welding electrode or the spot welding electrode shaft is normally straight (i.e. is not curved along the longitudinal axis of the spot welding electrode or the spot welding electrode shaft).

In addition to the above-mentioned features, a hand-held milling cutter for dressing spot welding electrodes additionally comprises a handle piece for holding the hand-held milling cutter. To obtain constantly good milling results, guide devices are of great benefit, especially in case of hand-held milling cutters. The corresponding also applies to cases where e.g. a welding gun is guided to or dressed with a firmly installed milling device for spot welding electrodes either manually or automated. However, guide devices for milling cutters might also be conceivable that are moved relative to a spot welding electrode or spot welding electrode shaft by machine. In the latter case, too, guide devices may lead to better milling results.

A feasible embodiment of the invention is outlined in FIG. 1a. Milling head 11 encompasses a milling cutter (not shown) driven via a gear (not visible) by a drive means 16 (e.g. a pneumatic motor) which is supplied with energy or pressurized air via the feed line 17. The milling cutter is located in a housing of milling head 11. In this example, a handle piece or grip 15 is mounted to the housing for holding the milling cutter. Below said milling head 11 an adapter 12 can be seen to which a guide device 13 has been mounted. A spot welding electrode 14 can be seen thereunder. However, this might also be a spot welding electrode shaft from which the spot welding electrode tip is protruding. When milling head 11 and spot welding electrode 14 are now being moved towards each other, the spot welding electrode tip moves through guide device 13 until it hits milling head 11. During the entire milling operation, spot welding electrode 14 is being kept in position by guide device 13 relative to milling head 11.

Figure 1B:
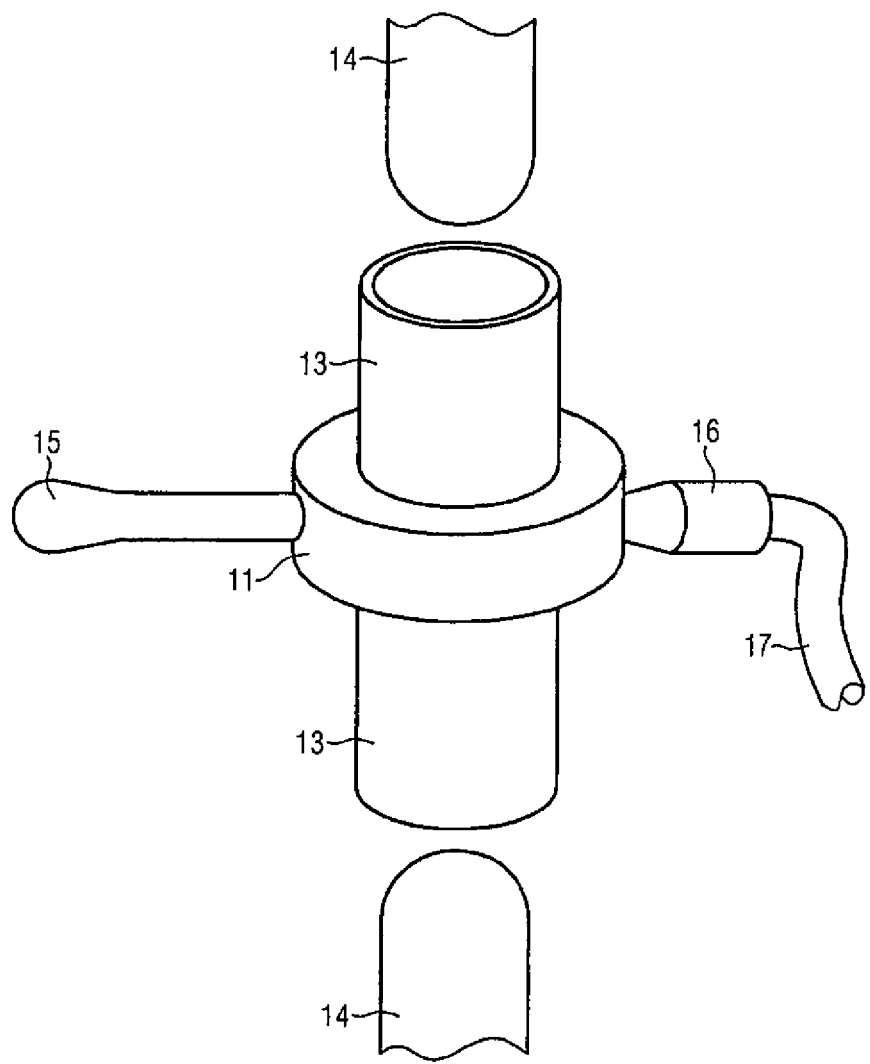
FIG. 1b is a schematic view of another device for dressing spot welding electrodes.

An alternative embodiment of the invention is outlined in FIG. 1b. Analogous to FIG. 1a, the device comprises a milling head 11, a drive means 16 with a line 17 and a handle piece 15. In this case, however, the milling head 11 is a double-sided milling head by means of which two spot welding electrodes 14 can be machined simultaneously. The two spot welding electrodes 14 can be components of a welding gun (not shown). Since, as shown, two spot welding electrodes 14 are to be machined simultaneously, the device also comprises two guide devices 13 so as to be able to guide or keep in position both spot welding electrodes during the welding operation. The embodiment according to FIG. 1b does not use any adapter pieces 12. However, corresponding embodiments might be conceivable with one or two adapter pieces 12 being mounted between milling head 11 and guide device 13.

Figure 2A:
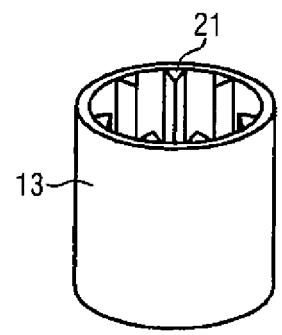
FIG. 2a is a schematic view of a guide device having spacers in the form of ribs.
Figure 2B:
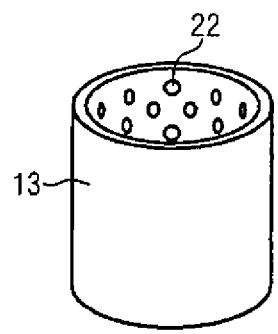
FIG. 2b is a schematic view of a guide device having spacers in the form of knobs.
Figure 2C:
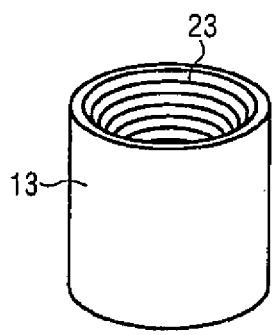
FIG. 2c is a schematic view of a guide device having spacers in the form of bulges.

FIGS. 2a to 2c respectively show annular guide devices 13 comprising spacers in the form of ribs 21, knobs 22 and bulges 23. The spacers serve to guide or keep a spot welding electrode 14 or a spot welding electrode shaft in position. The cavities between the spacers may serve to receive or discharge spot welding electrode material removed by milling, thereby preventing any clogging of milling head 11 or of guide device 13. However, guide devices 13 which have no spacers or which have grooves for receiving or discharging spot welding electrode material removed by milling are also conceivable. Furthermore, guide devices 13 are conceivable having a larger or smaller height with regard to the inner diameter of the respective guide device 13. Also conceivable are guide devices 13 of an inner diameter tapering towards milling head 11 or becoming larger with increasing distance to milling head 11. Introducing spot welding electrode 14 or the spot welding electrode shaft into guide device 13 on the side facing away from milling head 11 of guide device 13 can thus be facilitated.

Guide devices 13 are not necessarily of an annular form but can also be of different shapes suited to guide or keep spot welding electrodes 14 or spot welding electrode shafts in position. However, guide devices typically include a cavity for at least partially receiving a spot welding electrode or a spot welding electrode shaft. For example, the inner area of a guide device can have the form of a hollow cylinder or of a corresponding form of a variable radius. The hollow cylinder can, e.g. be of a circular cross-section. Generally, the cavity of a guide device has been adapted in at least a partial region to the shape of the spot welding electrode to be guided or the spot welding electrode shaft to be guided. Hence follows that a guide device having a square cavity (e.g. a chimney form) might be conceivable in case the spot welding electrodes or spot welding electrode shafts to be guided (except for the typically rounded spot welding electrode tips) are of a square cross-section.

The invention claimed is:

1. A device for dressing spot welding electrodes, comprising:
    a milling head that is adapted for dressing spot welding electrodes;
    a guide device that is adapted to guide the milling head relative to at least one of a spot welding electrode and a spot welding electrode shaft, wherein the guide device comprises spacers in the form of bulges or ribs or knobs for guiding the at least one of the spot welding electrode and the spot welding electrode shaft.

2. The device according to claim 1, wherein the guide device is adapted to prevent or restrict motions perpendicular to a longitudinal axis of the at least one of the spot welding electrode and the spot welding electrode shaft.

3. The device according to claim 1, wherein the guide device is connected to the milling head either directly or through an adapter piece.

4. The device according to claim 3, wherein the adapter piece enables use of diverse guide devices for one or more of spot welding electrodes and spot welding electrode shafts of different diameters.

5. The device according to claim 3, wherein the guide device rotates, during milling, around the at least one of the spot welding electrode and the spot welding electrode shaft.

6. The device according to claim 3, wherein the guide device does not rotate, during milling, around the at least one of the spot welding electrode and the spot welding electrode shaft.

7. The device according to claim 3, wherein the guide device is connected to the milling head or to the adapter piece by one or more of screws, bonding, and inserting.

8. The device according to claim 1, wherein the guide device is located on a side of the milling head from where the at least one of the spot welding electrode and the spot welding electrode shaft is being fed for machining.

9. The device according to claim 1, wherein the guide device is of a substantially annular shape.

10. The device according to claim 9, wherein a height of the guide device is at least equal to double an inner diameter of the guide device.

11. The device according to claim 1, wherein the at least one of the spot welding electrode and the spot welding electrode shaft has a maximum clearance of 1 mm in the guide device.

12. The device according to claim 1, wherein the guide device encompasses the at least one of the spot welding electrode and the spot welding electrode shaft in a side area which is at least 1 cm, 2 cm or 3 cm away from an outermost end to be dressed of the spot welding electrode.

13. A hand milling cutter for dressing spot welding electrodes, comprising:
- the device for dressing spot welding electrodes according to claim 1; and
- a handle piece.

* * * * *